United States Patent Office 3,269,901
Patented August 30, 1966

3,269,901
RODENT REPELLENT COMPOSITIONS COMPRISING PENTACHLOROBENZYL - ISOTHIOURONIUM CHLORIDE
Hermann Schnell, Krefeld-Urdingen, Gustav Buchwald and Werner Daum, Krefeld-Bockum, and Günther Hermann, Leverkusen, Germany, assignors to Farbenfabriken Bayer Aktiengesellschaft, Leverkusen, Germany, a corporation of Germany
No Drawing. Filed Feb. 12, 1963, Ser. No. 257,885
Claims priority, application Germany, June 21, 1960, F 31,722
4 Claims. (Cl. 167—46)

This application is a continuation-in-part of our co-pending application Serial No. 119,054, filed June 23, 1961, now abandoned.

This invention relates to the prevention of damage of vegetable materials which are normally attacked by rodents to a detrimental exent. More particularly, this invention relates to the use of pentachlorobenzyl-isothiouronium chloride as a rodent repellent. It further relates to the method of using pentachlorobenzyl-isothiouronium chloride as a rodent repellent and to compositions of matter comprising rodent foodstuffs, i.e., vegetable materials which are normally attacked by rodents, and pentachlorobenzyl-isothiouronium chloride.

It is known that rodents cause considerable damage by eating and destroying great amounts of various vegetable materials, especially those which are of economical and other importance. Examples of vegetable materials which are preferred by rodents are the various seeds which are used in farming and forestry, especially the various cereals, such as, for example, barley, oats, corn and wheat, grass and green seed and the seed of shortleaf pine, lodgepole pine, Sitka spruce, Douglas fir, piñon pine and bitterbrush. Besides the various seed, of course, also the other parts of the plants, for example, the germ buds and the barks, are susceptible to detrimental attack by rodents. It is to be understood that the expression "rodent foodstuff" which is used in the following description for the sake of simplicity means the total of the vegetable and other materials which are susceptible to detrimental attack by rodents, some of said materials being enumerated above by way of example only and not by way of limiting the scope of the present invention.

Likewise, the expression "rodent" is to be understood as defining all the various small rodents which normally attack rodent foodstuffs as defined above. Examples of such rodents which are given also by way of illustration only and not by way of limiting the scope of the present invention are: the meadow mouse, the various species of deer mice, for example, *Peromyscus maniculatus* and *Peromyscus nasutus* and the harvest mouse, the cotton rat and the ground squirrel.

In order to prevent the enormous damage which is caused by rodents eating and gnawing the vegetable materials, attempts have been made to use various chemical substances against the rodents. It has been proposed, for example, to combat the rodents with certain N-substituted thiourea derivatives, such as, N-α-naphthyl-thiourea and N - (4 - chlorophenyl - diazo)-thiourea. These materials, however, are food poisons which do not have repellent effects, i.e., in order to be effective they must be ingested in considerable amounts by the rodents. Furthermore, by the use of such food poisons which are also called rodenticides, it is not possible to reduce the damage caused by the rodents to the desired extent.

In contradistinction to the food poisons of the above mentioned type, good and effective rodent repellents are chemical materials which are not substantially poisonous, but prevent the rodents from eating and gnawing the materials impregnated therewith. Generally, rodent repellents are preferred to the food poisons for various reasons, for example, because they do not require special and expensive protective provisions, as is the case with food poisons. It is a special characteristic of good rodent repellents that they do not affect humans and that they are normally free of any taste and disagreeable odor. In addition, rodents which have eaten foodstuffs impregnated with rodent repellents get an aversion against said foodstuffs very soon, resulting in that first the amount of eaten foodstuff is reduced and, after a short period of time, the rodents completely avoid the foodstuff. This effect is generally referred to as educated avoidance.

Because of the many disadvantages of the poisonous rodenticides of the type mentioned above, efforts have been made to discover suitable rodent repellents for preventing rodent damage of the rodent foodstuffs. Inter alia, a greater number of alkyl-isothiouronium compounds have been tested. The best compound which heretofore has been proposed as a rodent repellent is benzyl-isothiouronium chloride. This compound possesses, however, still a number of disadvantages which render its use as a rodent repellent not very successful.

It has now been found that pentachlorobenzyl-isothiouronium chloride having the formula

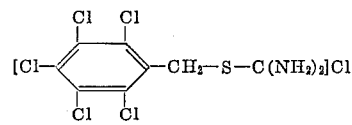

possesses a surprisingly high rodent repellency which is considerably better than the rodent repellency of the known isothiouronium compounds. Furthermore, the pentachlorobenzyl-isothiouronium chloride is distinguished by a high plant compatibility, a low toxicity to mammals and a long-lasting repellent effect when applied in the open field.

It is, therefore, an object of the present invention to provide pentachlorobenzyl-isothiouronium chloride as a rodent repellent. A further object of this invention is a method of repelling rodents from the attack of rodent foodstuffs by adding pentachlorobenzyl-isothiouronium chloride to the rodent foodstuffs. Another object of this invention is a composition of matter comprising a rodent foodstuff and pentachlorobenzyl-isothiouronium chloride as a rodent repellent.

The greatly improved rodent repellent activity of the pentachlorobenzyl-isothiouronium chloride in comparison with the rodent repellent activity of known isothiouronium compounds may be seen from the following Table I:

TABLE I

| Rodent repellent | Concentration, percent by weight | Foodstuff eaten in 24 hours, grams | Reduction of the amount eaten, percent |
|---|---|---|---|
| None | | 6.0 | 0.0 |
| Benzyl-isothiouronium chloride | 0.5 | 1.7 | 71.6 |
| Trichloro-m-xylylene-bis-isothiouronium chloride | 0.5 | 1.6 | 7.34 |
| Pentachlorobenzyl-isothiouronium chloride | 0.5 | 0.8 | 86.7 |

The above results were obtained in the following manner: to two joint-caged starved house mice (*Mus musculus*) were offered in 3 separate tests 6 grams of a test mixture of rodent foodstuffs in pelletized form which normally is voluntarily attacked by the rodents. This test mixture consists of barley, oats and corn seed, grass meal, fish meal, meat meal, barm, wheat buds, bone meal, minerals and vitamins. Besides that foodstuffs there were offered to the mice only water as desired.

The results given in column 3 of Table I show the surprisingly high repellent effect of the pentachlorobenzyl-isothiouronium chloride. The reduction of the amount of eaten foodstuff was as high as 86.7 percent in the case of the pentachlorobenzyl-isothiouronium chloride, whereas the corresponding value for benzyl-isothiouronium chloride is only 71.6 percent and for trichloro-m-xylylene-bis-isothiouronium chloride only 73.4 percent, of the foodstuff offered.

A further advantage of the pentachlorobenzyl-isothiouronium chloride consists in that the compound is scarcely soluble in water. The reduction of the amount of foodstuff eaten by the meadow mouse (Microtus pennsylvanicus) when tested with wheat grains containing 2 percent by weight of pentachlorobenzyl-isothiouronium chloride is lowered by a 22 weeks storage of the test foodstuff in open field only from 97.5 percent to 81 percent. In contrast, benzyl-isothiouronium chloride is very soluble in water and is therefore easily washed out from the foodstuff by rain-water.

The pentachlorobenzyl-isothiouronium chloride can be admixed with or otherwise combined with the rodent foodstuffs in any possible way, for example, in the form of dry or liquid formulations. If the rodent repellent is used in the form of a dry formulation, it can be admixed with various carriers, for example, clays, diatomaceus earth, talc, alumina-silica materials, active carbon and other inert, finely divided materials. In the case of using dry formulations it can be further advantageous to impregnate the rodent foodstuffs prior to the addition of the rodent repellent with small amounts of conventional binding agents, for example, polyalkylene glycol ethers and starch paste. Liquid formulations of the rodent repellent according to the present invention are, for example, dispersions thereof in inert liquids, e.g. water, alcohols and polyalkylene glycol ethers etc.

The amount of pentachlorobenzyl-isothiouronium chloride which is required for achieving good results in bestowing rodent repellent properties to the rodent foodstuffs are in the range of from about 0.5 percent to about 6 percent by weight of the rodent foodstuff. A preferred range is between about 1.0 and about 3.0 percent by weight. Normally high concentrations can be applied without disadvantages.

The following examples are given to illustrate in greater detail the use and the advantages of the pentachlorobenzyl-isothiouronium chloride as rodent repellent. They are given by way of illustration only and are not intended to limit the scope of the present invention.

Example 1

In order to show that pentachlorobenzyl-isothiouronium chloride is highly effective against a wide variety of rodents, i.e., possesses a broad effectivity range, 6 different species of rodents were tested in the following manner: wheat corns were admixed with 1 percent by weight of starch paste and thereafter intimately mixed with pentachlorobenzyl-isothiouronium chloride in the amounts given in the following Table II. In 6 separate tests, to 10 individually caged rodents of each of the 6 species indicated, were given two food cups respectively, one containing 25 grains of the above rodent foodstuff per day and the other containing a laboratory foodstuff mixture which is not very well liked by the rodents. When the said laboratory foodstuff is offered to the rodents together with non-impregnated wheat grains, the wheat grains were consumed by the rodents long before they ate the laboratory foodstuff.

The test is conducted over 10 days. In this time the 10 rodents of each species together normally eat 2500 grains of non-impregnated wheat. If the wheat grains are impregnated with a rodent repellent, there is observed a reduction of the amount of foodstuff eaten, which can be taken as a measure of the degree of the rodent repellency of the compound tested. The reduction of the amount eaten is given in percent of the amount of foodstuff which has not been attacked by the rodents, related to the total amount of the foodstuff offered to the rodents, and is 0 percent for non-impregnated wheat grains.

For the purpose of comparison of the effectivity range of the pentachlorobenzyl-isothiouronium chloride and of the effectivity range of benzyl-isothiouronium chloride, two additional tests 7 and 8 have been made with the latter rodent repellent.

TABLE II

| Test No. | Species | Pentachlorobenzyl-isothiouronium chloride, percent | Benzyl-isothiouronium chloride, percent | Results after 10 days, grains eaten/grains offered | Reduction of the amount eaten, percent |
|---|---|---|---|---|---|
| 1 | Ground squirrel (Citellus lateralis) | 2 | | *671/2,475 | 72.1 |
| 2 | Meadow mouse (Microtus pennsylvanicus) | 3 | | *56/2,200 | 97.5 |
| 3 | Deer mouse (Peromyscus maniculatus) | 2 | | 92/2,500 | 96.3 |
| 4 | Peromyscus nasutus | 2 | | 129/2,500 | 95 |
| 5 | Harvest mouse (Reithrodontomys spec.) | 3 | | *60.5/1,350 | 95.5 |
| 6 | Cotton rat (Sigmodon hispidus) | 2 | | *561.5/2,400 | 77 |
| 7 | Harvest mouse (Reithrodontomys spec.) | | 3 | *690/2,225 | 69 |
| 8 | Cotton rat, 5 animals (Sigmodon hispidus) | | 3 | *188/625 | 69.9 |

*In these cases some test animals died during the test. Therefore the total amount of offered wheat grains given in the table was reduced correspondingly. The results in the last column of the table are related to these reduced values.

The corresponding values for the reduction of the eaten amount which is obtained by testing trichloro-m-xylylene-bis-isothiouronium chloride is a concentration of 2% by weight with deer mice (Peromyscus maniculatus) is 21%. In addition, high values for the reduction of the eaten amount by the use of pentachlorobenzyl-isothiouronium chloride have been found also by conducting the same test with seed of the economically important plants bitterbrush (Purshia tridenta) and Sitka spruce (Picea sitchenses).

Example 2

Chips of fresh aspen bark (Populus tremuloides) were impregnated with pentachlorobenzyl-isothiouronium chloride in an amount of 6 mg./cm.$^2$. In two separate tests to 10 test animals (meadow mouse, Microtus pennsylvanicus) respectively, were offered to the above impregnated foodstuff and non-impregnated fresh aspen barks. The results are shown in the following Table III.

TABLE III

| Test animals No. | Percent by weight aspen bark chips eaten impregnated | Test animals No. | Percent by weight aspen bark chips eaten non-impregnated |
|---|---|---|---|
| 1 | 0 | 11 | 100 |
| 2 | 0 | 12 | 100 |
| 3 | 0 | 13 | 100 |
| 4 | 0 | 14 | 100 |
| 5 | 0 | 15 | 0 |
| 6 | 0 | 16 | 100 |
| 7 | 10 | 17 | 100 |
| 8 | 50 | 18 | 10 |
| 9 | 0 | 19 | 100 |
| 10 | 0 | 20 | 100 |

*Example 3*

This example demonstrates the amount of educated avoidance which can be achieved by the method of the present invention. To 10 test animals of the species *Microtus pennsylvanicus* (meadow mouse) and *Citellus lateralis* (ground squirrel) respectively, were offered over 10 days 250 wheat grains daily which were impregnated with pentachlorobenzyl-isothiouronium chloride as described in Example 1. In the following Table IV there are given the amounts of impregnated wheat grains eaten by the 10 test animals of each group per day.

TABLE IV

| Day | 1 | 2 | 3 | 4 | 5 | 6 | 7 | 8 | 9 | 10 |
|---|---|---|---|---|---|---|---|---|---|---|
| Test animal: | | | | | | | | | | |
| *Microtus pennsylvanicus* (meadow mouse) | 53 | 0 | 0 | 0 | 1 | 1 | 0 | 1 | 0 | 0 |
| *Citellus lateralis* (ground squirrel) | 250 | 154 | 39 | 59 | 16 | 44 | 38 | 20 | 34 | 17 |

*Example 4*

In order to show the excellent plant compatibility of the pentachlorobenzyl-isothiouronium chloride, the various plant seeds listed in the following Table V were impregnated with pentachlorobenzyl-isothiouronium chloride as described in Example 1 and its effect on germination of the seeds was evaluated by the usual germinating test procedure.

TABLE V

| Test plant | Percent pentachlorobenzyl-isothiouronium chloride | Percent benzyl-isothiouronium chloride | Germination ratio, number of germinated/test seeds |
|---|---|---|---|
| *Pinus echinata* (shortleaf pine) | 0 | | 160/200 |
|  | 2 | | 152/200 |
| *Pinus contorta* (lodgepole pine) | 0 | | 112/200 |
|  | 2 | | 136/200 |
| *Pseudotsuga taxifolia* (Douglas fir) | 0 | | 32/100 |
|  | 2 | | 78/100 |
| *Pinus edulis* (piñon pine) | 0 | | 20/75 |
|  | 3 | | 19/75 |
| *Purshia triderna* (bitterbrush) | 0 | | 41/50 |
|  | 2 | | 40/50 |
| *Triticum vulgare* (wheat) | 0 | | 100/100 |
|  | 3 | | 98/100 |
| *Triticum vulgare* (wheat) | | 0 | 48/100 |
|  | | 3 | 9/100 |

These tests show that the germination of the seeds is not substantially affected by the pentachlorobenzyl-isothiouronium chloride. Moreover, in some cases better results are obtained with the impregnated seeds, especially in the case of hardly germinating seed. In addition, the results given in the last two lines of the table make it clear that the toxicity to seed of the pentachlorobenzyl-iosothiouronium chloride is surprisingly much lower than the toxicity of the known benzyl-isothiouronium chloride.

Furthermore the toxicity to animals of the benzyl-isothiouronium chloride is considerably higher than the toxicity of pentachlorobenzyl-isothiouronium chloride. The acute peroral toxicity $LD_{50}$ to the deer mouse (*Peromyscus maniculatus*) is 1500 mg. per kg. body weight for pentachlorobenzyl-isothiouronium chloride and only 450 mg. kg. body weight for benzyl-isothiouronium chloride.

In Example 5 which follows the preparation of pentachlorobenzyl-isothiouronium chloride by the reaction of pentachlorobenzyl chloride with thiourea is described. The reaction can be carried out in the usual manner at temperatures from about 50 to about 130° C. in the presence of a suitable solvent. Examples of suitable solvents are lower alcohols, such as ethanol, propanol, isopropanol, butanol, isobutanol, lower glycols, such as ethylene glycol, diethylene glycol, and propylene glycol, and lower ketones, such as acetone and diethyl ketone.

*Example 5*

60 grams (0.2 mol) of pentachlorobenzyl chloride are dissolved in 300 milliliters of boiling butanol. 15.5 grams (0.203 mol) of thiourea are added thereto, with stirring, and the mixture is heated to boiling for two hours. The hot reaction mixture is then filtered off with suction and the collected crystals are subsequently washed with 50 milliliters of hot n-butanol. The yield of pentachlorobenzyl-isothiouronium chloride amounts to 66 grams, which is 87.5 percent of the theory. The product contains 56.3 percent by weight of chlorine and 8.1 percent by weight of sulphur; the calculated values are 56.8 percent chlorine and 8.55 percent sulphur. Upon heating to about 360° C., decomposition takes place.

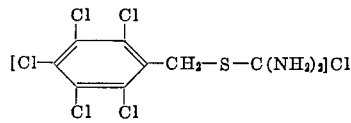

Molecular weight: 375.

We claim:

1. A composition for repelling rodents comprising pentachlorobenzyl-isothiouronium chloride in admixture with a rodent foodstuff.

2. A composition for repelling rodents as defined in claim 1 comprising pentachlorobenzyl-isothiouronium chloride in an amount between about 0.5 and about 6.0 percent by weight.

3. Process of protecting materials which are normally susceptible to attack by rodents which comprises protectively associating pentachlorobenzyl-isothiouronium chloride with the material to be protected.

4. The process of treating foodstuff to prevent consumption by rodents which comprises treating said foodstuff with a rodent repelling amount of S-pentachlorobenzylisothiuronium chloride.

References Cited by the Examiner

Bellack et al.: J. Agr. Food Chem., vol. 2, pages 1176–9, (1954).

Subject Index, C.A., vol. 50, p. 20085, (1956).

Welch: Agricultural and Food Chemistry, vol. 2, No. 3, pp. 142–9, (February 1954).

LEWIS GOTTS, *Primary Examiner.*

JULIAN S. LEVITT, IRVING MARCUS, *Examiners.*

D. B. MOYER, RICHARD L. HUFF,
*Assistant Examiners.*